(12) United States Patent
Clüsserath

(10) Patent No.: US 11,945,708 B2
(45) Date of Patent: Apr. 2, 2024

(54) MACHINE AND METHOD FOR FILLING CONTAINERS WITH LIQUID CONTENTS

(71) Applicant: KHS GmbH, Dortmund (DE)

(72) Inventor: Ludwig Clüsserath, Bad Kreuznach (DE)

(73) Assignee: KHS GmbH, Dortmund (DE)

(*) Notice: Subject to any disclaimer, the term of this patent is extended or adjusted under 35 U.S.C. 154(b) by 352 days.

(21) Appl. No.: 17/607,209

(22) PCT Filed: Apr. 30, 2020

(86) PCT No.: PCT/EP2020/062014
§ 371 (c)(1),
(2) Date: Oct. 28, 2021

(87) PCT Pub. No.: WO2020/225087
PCT Pub. Date: Nov. 12, 2020

(65) Prior Publication Data
US 2022/0219962 A1    Jul. 14, 2022

(30) Foreign Application Priority Data
May 8, 2019  (DE) .......................... 102019111929.4

(51) Int. Cl.
*B67C 3/10* (2006.01)
*A23L 2/54* (2006.01)
(Continued)

(52) U.S. Cl.
CPC .................. *B67C 3/10* (2013.01); *A23L 2/54* (2013.01); *B67C 3/225* (2013.01); *B67C 3/2617* (2013.01);
(Continued)

(58) Field of Classification Search
CPC ...... B67C 2007/006; B67C 2007/0066; B67C 3/10; B67C 3/08; B67C 3/12; B67C 3/065; A23L 2/54; A23V 2002/00
(Continued)

(56) References Cited

U.S. PATENT DOCUMENTS 6,457,495 B1 * 10/2002 Meheen ................ B67C 3/2617
141/49
7,721,773 B2 * 5/2010 Stadlmayr ................ B67C 3/06
141/7
(Continued)

FOREIGN PATENT DOCUMENTS

DE    19825559 A1 * 12/1999 ............... A23L 2/54
DE    19825559 A1    12/1999
(Continued)

OTHER PUBLICATIONS

Raimund Kalinowski. "Kribbeln auf der Zunge" 1-13 Getriinkeindustrie, Oct. 1, 2002 (Oct. 1, 2002). pp. 8-11. Retrieved from the Internet: https://www.sachverstand-gutachten.de/veroeffentlichungen/GI_I0-02_Kribbeln auf_der_Zunge.pdf.
(Continued)

*Primary Examiner* — Valentin Neacsu
(74) *Attorney, Agent, or Firm* — Occhiuti & Rohlicek LLP

(57) ABSTRACT

A filling machine includes filling elements, each having a seal that seals a container's mouth, a filling valve, a gas valve, a liquid channel that, when the filling valve is opened, is in fluid communication with the container's interior, and a gas channel that, when the gas valve is open, is in fluid communication with the container's interior. The filling machine introduces an inert gas into the container's interior via the gas channel to create a preload pressure in the container such that the inert gas in the container dissolves in the liquid when the liquid is later introduced into the (Continued)

container. The filling machine is further configured to introduce a volume of liquid into the container's interior through the liquid channel at a filling pressure that exceeds the preload pressure.

14 Claims, 3 Drawing Sheets

(51) Int. Cl.
  *B67C 3/22* (2006.01)
  *B67C 3/26* (2006.01)
  *B67C 7/00* (2006.01)
(52) U.S. Cl.
  CPC .......... *B67C 7/004* (2013.01); *A23V 2002/00* (2013.01); *B67C 2007/006* (2013.01); *B67C 2007/0066* (2013.01)
(58) Field of Classification Search
  USPC .......................................................... 53/432
  See application file for complete search history.

(56) References Cited

U.S. PATENT DOCUMENTS

| | | | | |
|---|---|---|---|---|
| 2001/0045242 A1* | 11/2001 | Clusserath | ............ | B67C 3/007 141/144 |
| 2002/0139434 A1* | 10/2002 | Meheen | .................. | B67C 3/10 141/59 |
| 2006/0162808 A1* | 7/2006 | Kropf | .................... | B67C 3/222 141/66 |
| 2007/0062160 A1* | 3/2007 | Stadlmayr | ............ | B01F 25/314 53/403 |
| 2007/0272562 A1* | 11/2007 | Noji | ........................ | C25F 7/00 204/225 |
| 2009/0266439 A1* | 10/2009 | Stolte | ................... | B08B 9/0813 141/105 |
| 2010/0037983 A1* | 2/2010 | Hiroya | ................. | B67C 3/2614 141/46 |
| 2013/0129870 A1* | 5/2013 | Novak | ...................... | A23L 2/54 426/115 |
| 2013/0256924 A1* | 10/2013 | Osaki | ...................... | B01F 25/54 261/36.1 |
| 2014/0097549 A1* | 4/2014 | Hoare | ................ | B01F 35/2112 261/64.3 |
| 2015/0284115 A1* | 10/2015 | Voth | ....................... | B65B 3/022 53/561 |
| 2016/0194188 A1* | 7/2016 | Clüsserath | ............... | B67C 3/10 141/7 |
| 2017/0120204 A1* | 5/2017 | Tipton | ............... | B01F 23/2362 |
| 2017/0166429 A1* | 6/2017 | D'Errico | .................. | B67C 3/04 |
| 2017/0203986 A1* | 7/2017 | Ervin | ................... | B01D 15/361 |
| 2019/0071295 A1* | 3/2019 | Clüsserath | ............... | B67C 3/16 |
| 2019/0106311 A1* | 4/2019 | Habersetzer | ............. | B67C 7/00 |
| 2019/0291329 A1* | 9/2019 | Kitzinger | ............. | B29C 49/783 |
| 2022/0219962 A1* | 7/2022 | Clüsserath | ............... | B67C 7/00 |

FOREIGN PATENT DOCUMENTS

| | | | |
|---|---|---|---|
| DE | 10028676 A1 | 6/2002 | |
| DE | 102016108502 A1 | 11/2017 | |
| DE | 102017123253 A1 | 4/2019 | |
| EP | 1127835 A1 | 8/2001 | |
| EP | 2272790 B1 | 3/2013 | |
| EP | 3473587 A1 | 4/2019 | |
| WO | WO-2010018848 A1 * | 2/2010 | .......... B67C 3/2614 |
| WO | 2018206698 A1 | 11/2018 | |

OTHER PUBLICATIONS

International Search Report, PCT Application No. PCT/EP2020/062014, dated Sep. 7, 2020 (6 pages).

* cited by examiner

MACHINE AND METHOD FOR FILLING CONTAINERS WITH LIQUID CONTENTS

RELATED APPLICATIONS

This application is the national stage of international application PCT/EP2020/062014, filed on Apr. 30, 2020, which claims the benefit of the May 8, 2019 priority date of German application DE 102019111929.4, the content of which is incorporated herein by reference.

FIELD OF INVENTION

The invention relates to a filling machine for filling containers with liquid.

BACKGROUND

In many cases, it is desirable to fill a container with a beverage having dissolved gas, such as carbon dioxide or nitrogen gas. When doing so, there exists a risk of foaming.

To avoid the risk of foaming, it is often necessary to slow the filling speed. This, however, slows down production.

SUMMARY

The invention relates to container processing machines in the beverage industry, in particular to container-processing machines with capacities of more than 5,000 containers per hour, and in particular to container processing machines with a capacity of more than 20,000 containers per hour. In particular, the invention relates to container processing machines that are configured and arranged as what are referred to as filling machines or fillers, for the filling of containers with liquid, in particular with beverages.

An object of the invention is that of providing an improved filling machine and a correspondingly improved method for the filling of containers with liquid that allows in particular for a rapid filling of the container and carbonating of the liquid and that has a structure that is as simple as possible.

In one aspect, the invention features a filling machine for the filling of containers with liquid. The containers include bottles, other containers similar to bottles, or also cans, and specifically manufactured from different materials. Examples of liquids include beverages and liquid foodstuffs.

The filling machine comprises filling positions, each having a filling element. In this situation. Each filling element comprises a sealing element for sealing a mouth of the container. When the mouth of the container is sealed with the sealing element, there is then no connection between the container's interior and the ambient air or atmosphere surrounding the container. In particular, a negative pressure or an overpressure can then be built up in the container. Moreover, each filling element comprises a liquid channel, which can be closed by a filling valve, and a gas channel, which can be closed by a gas valve. With the filling valve open, the liquid channel is in fluid connection with the container's interior, and, with the gas valve open, the gas channel is likewise in fluid connection with the container's interior. In other words, both the liquid channel and the gas channel end in the space that is sealed by the sealing element.

According to the invention, the filling machine is configured so as to introduce carbon dioxide or nitrogen gas via the gas channel into the container before filling with liquid, and to produce a preload pressure in the container. The end of the gas channel facing away from the container is therefore connected preferably to a cylinder, a reservoir, or another source. The carbon dioxide or nitrogen gas present under preload pressure in the container in this situation is the quantity required for the carbonating or nitrogenating the liquid. Furthermore, the filling machine is configured so as to introduce the liquid into the container via the liquid channel under a filling pressure that exceeds the preload pressure. That is to say, the filling machine is configured so as to create a filling pressure that is greater than the preload pressure produced and built up in the container. This is necessary in order for the liquid to be introduced at all against the preload pressure in the container. As the liquid flow into the container, the carbon dioxide present in the container is then dissolved directly into the liquid, and the liquid is thereby carbonated. Since the mouth of the container is sealed by the sealing element, the carbon dioxide cannot escape from the container during the filling process. With a filling machine configured in this way, a rapid filling of the container can be achieved with simultaneous carbonating of the liquid during the filling. In addition to this, such a filling machine is of a relatively simple structure.

In some embodiments, the liquid introduced into the container is either uncarbonated or only lightly carbonated. With uncarbonated liquid, the complete carbonating of the liquid takes place at the filling of the container. If, conversely, the liquid is already partially carbonated, only a follow-up carbonating takes place at the filling of the container. In both cases, the liquid in the container then has the desired carbon dioxide content or degree of carbonation and the filling of the containers takes place rapidly and simply.

Also among the embodiments are those in which the preload pressure amounts to between 0.1 bar and six bar and those in which it is between two bar and five bar. A preload pressure of 0.5 bar corresponds to approximately one gram of carbon dioxide per liter, a preload pressure of five bar corresponds to approximately ten grams of carbon dioxide per liter, and preload pressures of two bar and four bar correspond, respectively, to approximately four grams and eight grams of carbon dioxide per liter. Accordingly, the preload pressures cited are suitable for producing beverages with the carbon dioxide content conventional in the beverage industry, which extends up to some eight grams of carbon dioxide per liter.

In other embodiments, each filling element comprises a vacuum channel, which can be closed by a vacuum valve, wherein, with the vacuum valve open, the vacuum channel is in fluid connection with the container's interior, i.e. the vacuum channel ends in the space sealed by the sealing element. The filling machine is in such an embodiment is configured so as to produce a negative pressure in the container's interior by way of the vacuum channel, and/or to reduce the pressure in the region of the mouth of the container. Such a vacuum channel can be used in many ways. First, before the carbon dioxide is introduced into the container under preload pressure, air, or residual air, can be removed from the container via the vacuum channel. The less air or oxygen is still present in the container, the better the carbonating of the liquid can take place. Depending on how little residual air is intended to be present in the container, after evacuation the container can be filled with carbon dioxide via the gas channel and then evacuated once again. If appropriate, these steps can be repeated several times.

A flushing of the container is also possible, in that carbon dioxide is introduced simultaneously via the gas channel into the container and the gas mixture present in the container is suctioned out via the vacuum channel. This also removes air or residual air from the container.

An alternative to the evacuating or flushing of the container is to convey a container already prefilled with carbon dioxide to the filling element. In this case it is possible to do without further flushing and therefore without the vacuum channel.

After the filling of the container with the liquid, the pressure in the region of the mouth of the container can be adjusted to a specific value, and, if appropriate, can be relaxed at a later time to atmospheric pressure. In order to reduce the pressure, in this situation the vacuum valve is opened, so that surplus gas can escape from the region of the mouth of the container. The relaxing to atmospheric pressure can also take place by way of a further connection to the outside.

In some embodiments, the filling element comprises a pressure sensor, which is configured so as to measure the pressure in the container's interior and/or in the region of the mouth of the container. Based on the measured value from this pressure sensor, the gas valve and/or the vacuum valve can be controlled in such a way that a desired pressure exists in the container's interior or, respectively, in the region of the mouth of the container. This is of great significance for the preload pressure since the preload pressure determines the quantity of carbon dioxide that is dissolved in the liquid and therefore represents an important feature of the finished product.

In some embodiments, the sealing element is adjacent to a protection space. This protection space accordingly borders on the mouth of the container and is fluid communication with the container's interior. The container's interior and the protection space are however sealed against the surrounding environment. Furthermore, the liquid channel and the gas channel open into the protection space. Furthermore, each filling position comprises a closure device, wherein the closure device is configured such as to close the mouth of the container in the protection space with a closure. In this situation, the closure is, for example, a crown cork, a screw closure, or the cover of a beverage can. The container is closed in the protection space by the closure device. As a result, if this is not yet the case, the pressure in the protection space is adjusted to a value above the saturation pressure of the carbon dioxide in the liquid. Due to the fact that the container is closed immediately after the filling in the protection space, a particularly rapid filling and processing of the container is possible.

Also among the embodiments are those in which the filling positions are arranged on a circulating transport element, or rotor. By means of an inlet star, the containers are then taken over from the transport element, and, by means of an outlet star, the filled containers are then transferred to the container processing machine following downstream. In this way, a rapid following and processing of the containers can take place, without the containers having to be stopped in the interim.

In another aspect, the invention features a method for the filling of containers with liquid, the container being bottles, other bottle-like containers, or also cans. The liquid is either a beverage or a liquid foodstuff. The filling of the containers takes place by means of a filling machine in accordance with the foregoing description. In particular, the filling machine comprises a plurality of filling positions, wherein each filling position comprises a filling element. A mouth of the container is sealed with a sealing element of the filling element, such that the container's interior is no longer in contact with the ambient air. For the filling of the container, a filling valve that closes a liquid channel is opened, such that liquid is introduced into the container via the liquid channel under a filling pressure.

According to the invention, after the sealing of the mouth of the container and before the introduction of the liquid, a gas valve that closes the gas channel is opened. An end of the gas channel facing away from the container is in this situation connected to a carbon dioxide cylinder, a carbon dioxide reservoir, or another carbon dioxide source, such that, at the opening of the gas valve, and before the filling with the liquid, carbon dioxide is introduced into the container, and a preload pressure is produced in the container. The carbon dioxide present in the container under preload pressure has the quantity required for the carbonating of the liquid. Next, the liquid is introduced into the container under a pressure that exceeds the preload pressure. In order to be able then to introduce the liquid into the container against the preload pressure, the filling pressure is particularly advantageously selected as greater than the preload pressure. With this method a rapid filling of the container can be achieved, with the simultaneous carbonating of the liquid.

In some practices, the container preloaded with carbon dioxide is filled with liquid that is uncarbonated or only partially carbonated. With non-carbonated liquid, the complete carbonating of the liquid during the filling of the container takes place during the filling of the container. Conversely, if the liquid is already partially carbonated, then, during the filling of the container, only follow-up carbonating takes place. In both cases, the liquid in the container then exhibits the required carbon dioxide content or degree of carbonating, and the filling of the container takes place rapidly and simply.

Advantageously, at the introduction of the liquid into the container, the carbon dioxide present in the container is immediately dissolved in the liquid, and thereby the liquid is at least partially carbonated. Due to the fact that the mouth of the container is sealed, the carbon dioxide also cannot escape from the container. This therefore results in a rapid carbonating of the liquid.

It is also of advantage if the pressure pertaining in the container's interior and/or in the region of the mouth of the container is measured by means of a pressure sensor.

The gas valve, and any other valves that allow for a gas inflow or outflow into and out of the space enclosed by the sealing element, are then controlled as a dependency of the measured values from the pressure sensor in such a way that the desired pressure pertains in the container's interior and in the region of the mouth of the container respectively. This is of great significance for the preload pressure in particular, since the preload pressure determines the quantity of carbon dioxide that is dissolved in the liquid, and it therefore represents an important feature of the finished product.

It is also advantageous if, before the introduction of the carbon dioxide under preload pressure into the container, the container is first evacuated via a vacuum channel. Any air or residual air still in the container is therefore removed from the container, which improves the carbonating of the liquid. Depending on how little residual air should be present in the container, after the evacuation via the gas channel the container can then be filled with carbon dioxide and then evacuated once again. These steps can be repeated several times if appropriate. As an alternative or in addition to the evacuation of the container, the container can be flushed with carbon dioxide. For this purpose carbon dioxide is simultaneously introduced into the container via the gas channel, and the gas mixture present in the container is sucked out via the vacuum channel. This also removes air or residual air from the container.

In a particularly advantageous variant of the method, a closure cover is applied in a protection space, which is adjacent to the sealing element. The closure cover is in this case, for example, a crown cork, a screw closure, or the lid of a beverage can. The protection space is adjacent to the mouth of the container, and is in fluid contact with the container's interior. The container's interior and the protection space are, however, sealed against their surroundings. After the introduction of the liquid into the container, a pressure is preferably set in the region of the mouth of the container that lies above the saturation pressure of the carbon dioxide of the liquid present in the container. In this situation it is entirely possible for the pressure prevailing in the region of the mouth of the container, after the filling of the container with the liquid, will already exhibit the desired value. Accordingly, the mouth of the container will be closed with the closure cover. Since the closure of the container can take place immediately after the filling of the container, this method is particularly rapid. After the closing of the container, the mouth of the container is released from the sealing element and the container is transported onwards or transferred to the container processing machine following downstream.

In another advantageous variant of the method, after the introduction of the liquid a pressure is preferably set in the region of the mouth of the container that is approximately equal to the saturation pressure of the carbon dioxide of the liquid present in the container. At this pressure, the liquid present in the container undergoes stirring for a predetermined period of time. Due to the pressure that is approximately equal to the saturation pressure of the carbon dioxide of the liquid present in the container, it will be ensured that, during the stirring of the liquid, no carbon dioxide escapes from the liquid, while on the other hand no further carbon dioxide will be absorbed by the fluid. After the stirring of the liquid has been carried out, the pressure in the region of the mouth of the container is relaxed to atmospheric pressure, and the container is transported to a closure device. Since a specific period of time must be allowed for the stirring of the liquid, this method is slower than that presented previously. The filling machine is easier to construct, however, since a filling device that closes the container in the protection space can be omitted.

In another aspect, the invention features a filling machine that fills containers with liquid, the filling machine comprising filling positions, each of which comprises a filling element, wherein each of the filling elements comprises a seal that seals a container's mouth, a filling valve, a gas valve, a liquid channel that, when the filling valve is opened, is in fluid communication with the container's interior, and a gas channel that, when the gas valve is open, is in fluid communication with the container's interior, wherein the filling machine is configured to introduce an inert gas into the container's interior via the gas channel to create a preload pressure in the container such that the inert gas in the container dissolves in the liquid, wherein the filling machine is further configured to introduce a volume of liquid into the container's interior through the liquid channel at a filling pressure that exceeds the preload pressure.

Embodiments include those in which the inert gas is either nitrogen gas and carbon-dioxide gas.

Further embodiments, advantages, and possible applications of the invention also derive from the following description of exemplary embodiments and from the Figures. In this context, all the features described and/or represented in the images are in principle the object of the invention, alone or in any desired combination, regardless of their arrangement in the claims or reference to them. The contents of the claims are also made a constituent part of the description.

Although some aspects have been described in connection with a device, it is understood that these aspects also represent a description of the corresponding method, such that a block element or structural element of a device is also to be understood as a corresponding method step or as a feature of a method step. By analogy with this, aspects that have been described in connection with, or as, a method step also represent a description of a corresponding block or detail or feature of a corresponding device. Some or all of the method steps can be carried out by a hardware apparatus (or with the use of a hardware apparatus), such as, for example, a microprocessor, a programmable computer, or an electronic circuit. With some exemplary embodiments, some or many of the most important method steps can be carried out by such an apparatus.

BRIEF DESCRIPTION OF THE DRAWINGS

The invention is described in greater detail hereinafter on the basis of the Figures in respect of exemplary embodiments. The Figures show, by way of example.

Identical reference numbers are used in the Figures for elements of the invention that are the same or have the same effect. In addition, for the sake of easier overview, only reference numbers are represented in the Figures that are required for the description of the respective Figure.

DETAILED DESCRIPTION

Figure 1:
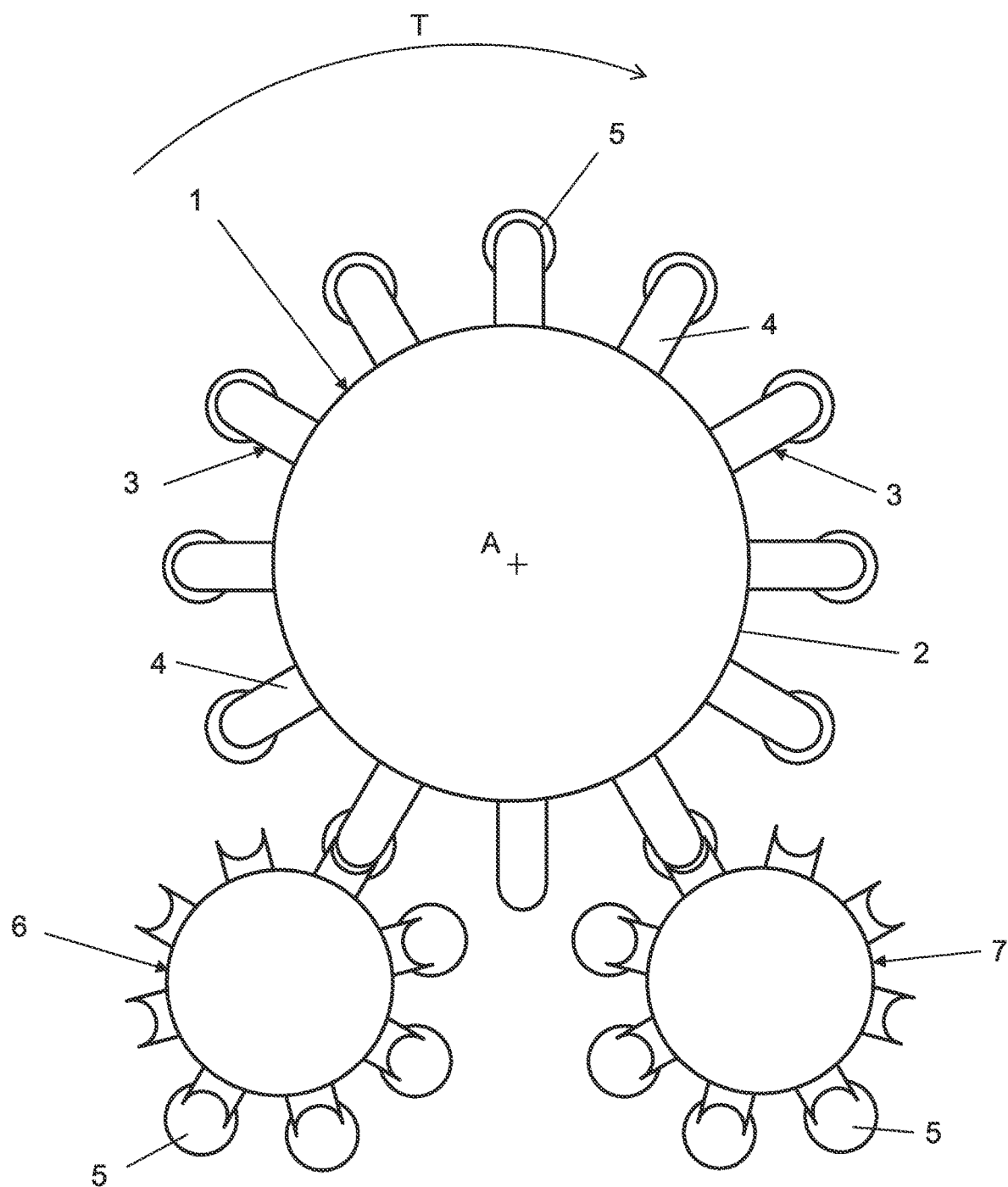
FIG. 1 shows a view from above a filling machine.

FIG. 1 shows a filling machine 1 having a rotor 2 that rotates about a vertical axis "A". The rotor's circumference has filling positions 2, each of which comprises a filling element 4. During operation, an inlet star 6 provides the rotor 2 with containers 5 that are to be filled. The rotor 2 moves the containers 5 in a transport direction as it fills them. It then transfers the filled containers 5 to an outlet star 7 that conveys them on for further processing.

Figure 2:
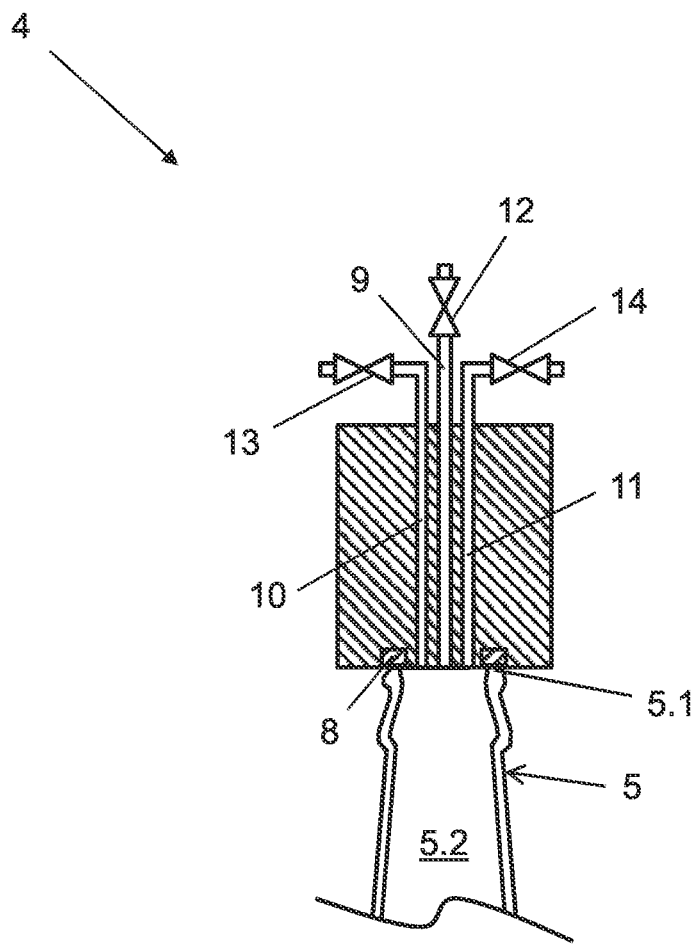
FIG. 2 shows a section through one of the filling elements shown in FIG. 1.

FIG. 2 shows one of the filling elements 4 engaged with a container 5 that is to be filled. Although the container 5 shown herein is a bottle, other containers, such as cans, can also be filled.

The filling element's underside features a seal 8 that seals the container's mouth 5.1, thereby isolating the container's interior 5.2 from ambient air surrounding the container 5. In the illustrated embodiments, the seal 8 is a ring seal.

The filling element 4 further comprises a liquid channel 9, a gas channel 10, and a vacuum channel 11, each of which is in fluid communication with the container's interior 5.2. The filling element 4 also includes a filling valve 12 that closes the liquid channel 9, a gas valve 13 that closes the gas channel 10, and a vacuum valve 14 for closing the vacuum channel 11.

Once the mouth 5.1 has been sealed at the seal 8, an evacuation step is carried out by opening the vacuum valve 14 opens to evacuate air from the container's interior 5.2 and closing it shortly thereafter.

In some cases, the vacuum is strong enough to evacuate nearly all the ambient air, in which case filling can commence thereafter. In other cases, too much residual air remains. Under these circumstances, a gas-insertion step is carried out by opening the gas valve 13 for a specific period of time, thereby allowing an inert gas from a gas source to flow through the gas channel 10 and into the container's interior 5.2. This fills the container's interior 5.2 with a mixture of mostly inert gas with some residual air. The foregoing is then evacuation step is then repeated. This gas-insertion step is then followed by another evacuation step. These steps are as often as needed to attain a sufficiently low concentration of ambient air in the container's interior 5.2.

An alternative embodiment replaces the evacuation step with a flushing step, in which the container's interior 5.2 is flushed with inert gas. This is carried out by opening the gas valve 13 and vacuum valve 14 concurrently so that inert gas flows into the container 5 as a mixture of air and carbon dioxide is sucked out of the container, with the ratio of air in the mixture progressively decreasing.

Another embodiment avoids the foregoing steps by providing a container 5 already filled with inert gas to the filling element 4, thereby obviating the need for the vacuum channel 11 and the vacuum valve 14.

To prepare the container 5 for filling, the container is filled, via the gas channel 10, with enough inert gas to achieve a predetermined preload pressure in the container's interior 5.2. This preload pressure is high enough to cause the inert gas to dissolve in the liquid as the liquid fills the container 5. In a preferred embodiment, inert gas in the container 5 dissolves immediately as the liquid flows into the container 5.

Preferably, the liquid enters the container 5 with no dissolved inert gas or only a small amount of dissolved inert gas. The quantity of inert gas present in the container 5 is the difference between the amount of inert gas already dissolved, if any, and the desired amount of dissolved inert gas. For the case in which the inert gas is carbon dioxide, a preload pressure of one bar corresponds to approximately two grams of dissolved carbon dioxide per liter. To carbonate a completely uncarbonated liquid to achieve the typical value of eight grams per liter, the preload pressure is approximately four bar.

In some embodiments, a pressure sensor measures pressure in the container's interior 5.2. The resulting measurement provides a basis for controlling the gas valve 13 to attain the desired preload pressure in the container's interior 5.2. In other embodiments, different methods for attaining the desired preload pressure are used.

Upon reaching the desired preload pressure, the gas valve 13 closes and the filling valve 12 opens. This permits the liquid to flow through the liquid channel 9 from a reservoir into the container 5. Since the container's interior 5.2 has been pressurized to a preload pressure, it is necessary to pressurize the liquid with a filling pressure that exceeds the preload pressure.

When the desired volume of liquid has entered the container 5, the filling valve 12 closes. Attainment of the desired liquid volume can be determined based on a predetermined filling time or based on a measurement from a flowmeter or a filling-level probe.

Upon completion of filling, the head space at the container's mouth 5.1 is pressurized to the liquid's saturation pressure. At this point, the inert gas will have been dissolved into the liquid.

The pressurization step is carried out by measuring the pressure with a pressure sensor and either introducing additional inert gas via the gas channel 10 or removing inert gas via the vacuum channel 11. With the pressure having been thus set, stirring of the liquid present in the container 5 takes place over a predetermined period of time, after which the vacuum valve 14 is then opened and the pressure in the container's interior 5.2 is relaxed to atmospheric pressure.

The container 5 is next drawn downwards, thereby breaking the seal between the seal 8 and the container's mouth 5.1. The container is then transported to a closing machine that closes the container 5.

Figure 3:
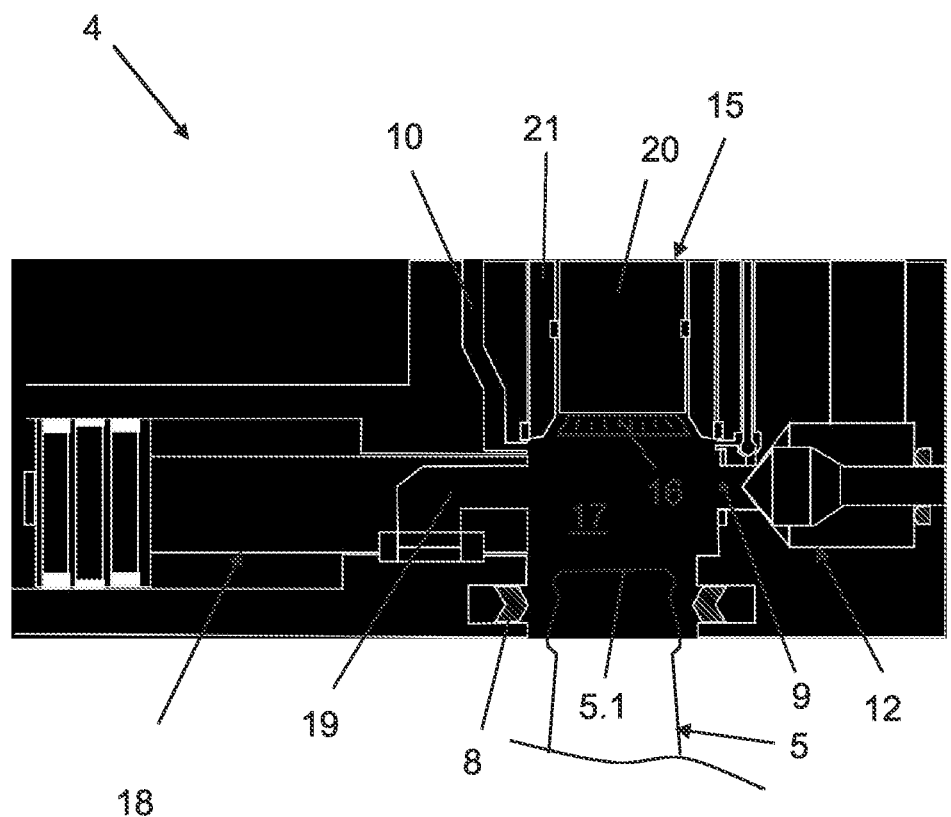
FIG. 3 shows a side view of an alternative filling element.

FIG. 3 shows a further embodiment of a filling element 4 that features a closure device 15 that closes the container 5 with a closure 16, which in the illustrated embodiment is a crown cork.

The container 5 to be filled is first introduced from below into a cut-out opening of the filling element 4. The seal 8, which is again a ring seal, then surrounds the container 5 from the outside such that the cut-out opening in the filling element 4 forms a protection space 17 that isolates various components from the from the surrounding environment. These include the container's mouth 5.1, an end of the liquid channel 9, an end of the gas channel 10, an end of the vacuum channel, which is not visible in FIG. 3, and the closure 16.

The evacuation, flushing, and pressure preloading of the container 5 are carried out in the same manner as that described in connection with FIG. 2.

In the illustrated embodiment, the end of the liquid channel 9 opens onto a side of the protection space 17. The liquid thus has to make a turn to enter the container 5. An angled connecting-channel 16 enables this turn to be carried out.

A thruster 18 pushes the angled connecting channel 16 sideways into the protection space 17 towards the opening of the liquid channel 8. The thruster 18 pushes the connecting channel 16 into the protection space 17 in such a way that one end of the connecting channel 19 connects to the end of the liquid channel 9 and the other end of the connecting channel 19 comes to lie directly above the container's mouth 5.1, thereby ensuring reliable filling of liquid into the container 5.

After the filling of the liquid into the container 5, the thrust element 18 and the connecting channel 19 are retracted. If necessary, the pressure in the protection space 17 is adjusted to a pressure that is above the saturation pressure of the liquid that is now in the container 5.

In embodiment shown in FIG. 3, it is possible to avoid the waiting time that arises from having to stir the liquid in the container 5. This is carried out by closing the container 5 at the pressure prevailing in the protection space 17. The embodiment shown in FIG. 3 thus promotes more rapid filling.

The closure 16, which was previously into the protection space 17, is held over the container's mouth 5.1. A counter-holder 20 presses the cover 16 onto the container's mouth 5.1. A pull ring 21, which is arranged concentrically around the counter-holder 20, then draws the sides of the crown cork 16 over the container's mouth 5.1, thereby closing the container 5.

After removing the seal 8 from the container 5, the container 5 is drawn downwards out of the protection space 17 and then transported onwards for further processing.

The invention has been described heretofore by way of exemplary embodiments. It is understood that a large number of modifications or derivations are possible without thereby departing from the scope of protection of the invention defined by the claims.

In particular, inert gases other than carbon dioxide can be used. For example, some embodiments uses nitrogen gas as an inert gas, in which case nitrogen rather than carbon dioxide is dissolved in the liquid.

The invention claimed is:

1. An apparatus comprising a filling machine that fills containers with liquid, said filling machine comprising filling positions, each of which comprises a filling element, wherein each of said filling elements comprises a seal that seals a container's mouth, a filling valve, a gas valve, a liquid channel that, when said filling valve is opened, is in fluid communication with said container's interior, and a gas channel that, when said gas valve is open, is in fluid communication with said container's interior, wherein said filling machine is configured to introduce an inert gas into said container's interior via said gas channel to create a preload pressure in said container such that said inert gas in said container dissolves in said liquid, wherein said filling machine is further configured to introduce a volume of liquid into said container's interior through said liquid channel at a filling pressure that exceeds said preload pressure, and wherein said inert gas is selected from the group consisting of nitrogen gas and carbon-dioxide gas, wherein said filling element is configured to measure pressure in said container's interior, and wherein each filling element comprises a protection space and a closing device, wherein said protection space is adjacent to said seal, and wherein said closing device is configured to close said container with a closure while said container is in said protection space.

2. The apparatus of claim 1, wherein said filling element is configured to use said pressure measurement in said container as a basis for controlling said gas valve to attain a desired preload pressure in said container's interior.

3. The apparatus of claim 1, wherein said filling machine is configured to introduce, into said container's interior, an amount of inert gas that is equal to the difference between an amount of inert gas dissolved in said volume of liquid and a desired amount of inert gas to be dissolved in said volume of liquid.

4. The apparatus of claim 1, wherein said filling machine is configured to cause said preload pressure to be between two bar and five bar.

5. The apparatus of claim 1, wherein each filling element further comprises a vacuum valve and a vacuum channel that is in fluid connection with said container's interior when said vacuum valve is open.

6. The apparatus of claim 1, wherein said filling element is configured to use said pressure measurement in said container as a basis for introducing additional inert gas via said gas channel or removing inert gas by opening a vacuum valve that leads to a vacuum channel that is in fluid connection with said container's interior when said vacuum valve is open.

7. A method of using a filling machine to fill containers with liquid, said filling machine comprising filling positions, each of which comprises a filling element, wherein each of said filling elements comprises a seal that seals a container's mouth, a filling valve, a gas valve, a liquid channel that, when said filling valve is opened, is in fluid communication with said container's interior, and a gas channel that, when said gas valve is open, is in fluid communication with said container's interior, wherein said filling machine is configured to introduce an inert gas into said container's interior via said gas channel to create a preload pressure in said container such that said inert gas in said container dissolves in said liquid, wherein said filling machine is further configured to introduce a volume of liquid into said container's interior through said liquid channel at a filling pressure that exceeds said preload pressure, and wherein said inert gas is selected from the group consisting of nitrogen gas and carbon-dioxide gas, said method comprising causing a preload pressure in said container, wherein causing said preload pressure comprises opening said gas valve to permit a quantity of said inert gas to enter said container through said gas channel, wherein said quantity of said inert gas, when dissolved into said volume, causes said volume of said liquid to have a desired quantity of dissolved inert gas, wherein causing said preload pressure further comprises measuring pressure in said container, said method further comprising accommodating a closure in a protection space adjacent to said seal, introducing said liquid into said container, after having introduced said liquid, setting a pressure in said container to be above saturation pressure of dissolved inert gas in said liquid, closing said container with said closure, and releasing said container.

8. The method of claim 7, further comprising selecting said liquid to be one that enters said container with no dissolved inert gas.

9. The method of claim 7, further comprising using said pressure measurement in said container as a basis for controlling said gas valve to attain a desired preload pressure in said container's interior.

10. The method of claim 7, further comprising introducing said volume of liquid into said container, wherein said inert gas in said container dissolves in said liquid as said liquid is introduced and, upon completion of filling said container, pressurizing a head space at said container's mouth to a saturation pressure of said liquid.

11. The method of claim 7, further comprising evacuating said container prior to causing said preload pressure in said container.

12. The method of claim 7, further comprising using said pressure measurement in said container as a basis for introducing additional inert gas via said gas channel.

13. The method of claim 7, further comprising using said pressure measurement in said container as a basis for removing inert gas by opening a vacuum valve that leads to a vacuum channel that is in fluid connection with said container's interior when said vacuum valve is open.

14. The method of claim 7, further comprising, after having filled said container, adjusting a pressure in said protection space to be above said saturation pressure of said liquid in said container.

\* \* \* \* \*